United States Patent
Devadasan et al.

(10) Patent No.: US 12,514,548 B2
(45) Date of Patent: Jan. 6, 2026

(54) ULTRASOUND TRANSDUCER ACOUSTIC COUPLING

(71) Applicant: XIVER MEMS FOUNDRY B.V., Eindhoven (NL)

(72) Inventors: Dhilan Skukunan Devadasan, London (GB); Franciscus Johannes Gerardus Hakkens, Eersel (NL); Lucas Johannes Anna Maria Beckers, Veldhoven (NL); Edward Theodoros Maria Berben, Herten (NL)

(73) Assignee: XIVER MEMS FOUNDRY B.V., Eindhoven (NL)

( * ) Notice: Subject to any disclaimer, the term of this patent is extended or adjusted under 35 U.S.C. 154(b) by 1176 days.

(21) Appl. No.: 16/959,459

(22) PCT Filed: Jan. 3, 2019

(86) PCT No.: PCT/EP2019/050050
§ 371 (c)(1),
(2) Date: Jul. 1, 2020

(87) PCT Pub. No.: WO2019/134921
PCT Pub. Date: Jul. 11, 2019

(65) Prior Publication Data
US 2021/0068785 A1    Mar. 11, 2021

(30) Foreign Application Priority Data
Jan. 3, 2018   (EP) ................................... 18150145

(51) Int. Cl.
*A61B 8/00*   (2006.01)
*A61K 49/22*  (2006.01)

(52) U.S. Cl.
CPC .......... *A61B 8/4281* (2013.01); *A61K 49/222* (2013.01)

(58) Field of Classification Search
CPC ........................... A61K 49/226; A61B 8/4281
See application file for complete search history.

(56) References Cited

U.S. PATENT DOCUMENTS

| | | | |
|---|---|---|---|
| 5,454,373 | A | 10/1995 | Koger et al. |
| 6,039,694 | A | 3/2000 | Larson et al. |
| 6,343,512 | B1 | 2/2002 | Bourne et al. |
| 2001/0033825 | A1 | 10/2001 | Douglas |

(Continued)

FOREIGN PATENT DOCUMENTS

| | | | |
|---|---|---|---|
| JP | H0368362 A | * | 8/1989 |
| WO | 2015130841 A1 | | 9/2015 |

OTHER PUBLICATIONS

International Search Report and Written Opinion for International Application No. PCT/EP2019/050003, filed Jan. 2, 2019, 12 pages.

(Continued)

*Primary Examiner* — Anh Tuan T Nguyen
*Assistant Examiner* — Younhee Choi
(74) *Attorney, Agent, or Firm* — KDW Firm PLLC

(57) ABSTRACT

An acoustic coupling layer (20) is disclosed for acoustically coupling an ultrasound transducer (30, 60) to a body region (1), the acoustic coupling layer comprising a polar liquid absorbent polymer (24) embedded in an elastomer (22). Also disclosed are an ultrasound transducer, wearable patch and interface patch including such an acoustic coupling layer.

19 Claims, 4 Drawing Sheets

(56) References Cited

U.S. PATENT DOCUMENTS

| | | |
|---|---|---|
| 2005/0215901 A1 | 9/2005 | Anderson et al. |
| 2011/0113886 A1* | 5/2011 | Elejalde ............... A61B 8/4281 |
| | | 73/644 |
| 2013/0144193 A1 | 6/2013 | Lewis, Jr. et al. |
| 2013/0204140 A1 | 8/2013 | Irie |
| 2015/0119837 A1 | 4/2015 | Thompson, Jr. et al. |
| 2015/0190543 A1* | 7/2015 | Marshall ................. A61L 15/24 |
| | | 424/443 |
| 2017/0281124 A1* | 10/2017 | Arai ..................... A61B 8/0825 |
| 2020/0061393 A1* | 2/2020 | Lewis, Jr. ............ A61B 8/4411 |

OTHER PUBLICATIONS

Bourne, et al., "Novel Solid Contact Ultrasonic Couplants Based on Hydrophilic Polymers", 13 pages (Abstract).

"Ultrasound-coupling Hydrogel Pad Eliminates Need for Ultrasound Gel", Imaging, SonoFast Inc., published Aug. 19, 2015, 1 page (Abstract).

* cited by examiner

ULTRASOUND TRANSDUCER ACOUSTIC COUPLING

RELATED APPLICATIONS

This application is the U.S. National Phase application under 35 U.S.C. § 371 of International Application No. PCT/EP2019/050050, filed on Jan. 3, 2019, which claims priority to European Application Serial No. 18150145.3, filed Jan. 3, 2018. These applications are hereby incorporated by reference herein.

FIELD OF THE INVENTION

The present invention relates to an acoustic coupling layer for acoustically coupling an ultrasound transducer to a body region.

The present invention further relates to an ultrasound transducer comprising such an acoustic coupling layer.

The present invention further relates to a wearable patch comprising such an ultrasound transducer.

The present invention further relates to a patch for mounting such an ultrasound transducer on a patient's body portion.

BACKGROUND OF THE INVENTION

Ultrasound imaging is an increasingly important diagnostic tool. In addition to high resolution imaging in hospitals and other medical practices, ultrasound imaging is more increasingly being used for patient monitoring over a prolonged period of time. In such a scenario, the patient typically wears a patch including an ultrasound transducer comprising one or more ultrasound transducer cells, which transducer is used to monitor a particular part of the patient's anatomy over such a time period.

The use of such wearable ultrasound patches for instance is contemplated for hemodynamic monitoring, in which parameters such as blood flow, pulse pressure, pulse wave velocity, cardiac output and cross-sectional dimensions of arteries may be monitored, bladder monitoring, e.g. within the clinical settings of a hospital, in which patient urine production and hydration rates may be monitored, coronary chronic total inclusion (CTO) monitoring to visualize large CTOs (>10 cm) that cannot be visualized using contrast-enhanced fluoroscopy and vascular access monitoring for the purpose of ultrasound-based diagnosis and treatment of peripheral diseases. Other applications of such longer-term ultrasound patient monitoring will be apparent to the skilled person.

As is well-known per se, in order to achieve a good acoustic coupling between the ultrasound transducer and the patient's body, a coupling agent, i.e. fluid, such as an ultrasound conductive gel typically is applied between the ultrasound transducer and the patient's body. During application of such an ultrasound transducer to the patient's body, pressure is applied to evacuate air bubbles from the coupling agent in order to establish the desired acoustic contact. The duration of ultrasound investigations in a clinical setting such as a hospital is relatively short, e.g. 5-15 minutes, which means that the coupling agent does not have time to dry out or otherwise degrade.

Such a coupling agent is equally desirable when applying a wearable ultrasound patch to a patient's body in order to establish the desired acoustic coupling between the patch and the patient's body. However, the use of a coupling agent in this context is not without challenges. Firstly, care has to be taken that the coupling agent does not interfere with the adhesion of the patch to the patient's body in case of an adhesive patch. Moreover, degradation, e.g. drying out, of the coupling agent over the period during which the patch is worn by the patient must be prevented as much as possible.

U.S. Pat. No. 6,343,512 B1 discloses an ultrasound probe including a cross-linked hydrophilic material as an integral couplant. To control the acoustic impedance and/or the mechanical property of the couplant, an additional hydrophilic or non-hydrophilic material may be dispersed in the couplant. However, it is difficult to obtain an integral couplant with such materials that has sufficiently low friction in contact with a body region of a patient.

US 2017/128042 A1 discloses devices and methods for ultrasound transmission without the need for external couplants, such as gels.

U.S. Pat. No. 6,039,694 discloses a homogeneous, solid, elastic, biocompatible sheath which is arranged conformal to an ultrasound transducer.

WO 2015/130841 A1 discloses ultrasound coupling devices, systems and methods.

SUMMARY OF THE INVENTION

The present invention seeks to provide an acoustic coupling layer for acoustically coupling an ultrasound transducer to a body region in a low-friction manner.

The present invention further seeks to provide an ultrasound transducer comprising such an acoustic coupling layer.

The present invention further seeks to provide a wearable patch comprising such an ultrasound transducer.

The present invention further seeks to provide a patch for mounting such an ultrasound transducer on a patient's body portion.

According to an aspect, there is provided a patch for acoustically coupling an ultrasound transducer to a body region, the patch comprising: a holder for the ultrasound transducer; and an acoustic coupling layer for acoustically coupling an ultrasound transducer to a body region, the acoustic coupling layer providing an interface layer between the ultrasound transducer and the body region when the ultrasound transducer is mounted in the holder, wherein the acoustic coupling layer comprises a polar liquid absorbent polymer embedded in an elastomer. The present invention is based on the insight that a polar liquid absorbent polymer may be used as a liquid reservoir within such an acoustic coupling layer whilst the elastomer provides the acoustic coupling layer with the required stability in terms of volume whilst at the same time ensuring a low friction contact between the acoustic coupling layer when applied to an ultrasound transducer and a skin region of a patient to be examined or treated using such an ultrasound transducer.

The polar liquid absorbent polymer is embedded in the elastomer in the form of a plurality of particles, which has the advantage that the acoustic coupling layer may be manufactured in a straightforward and cost-effective manner. In addition, by dispersing such particles throughout the acoustic coupling layer, localized reservoirs for the polar liquid, e.g. water, an alcohol or a mixture thereof, are provided throughout the acoustic coupling layer such that substantially uniform wetting of the contact surface of the acoustic coupling layer with the patient's skin is provided in this manner.

The particles have a diameter of less than 10% of any acoustic wavelength produced by the ultrasound transducer such that the particles are substantially acoustically transparent to such ultrasound waves, thereby minimizing scattering effects of such ultrasound waves caused by the particles.

In at least some embodiments, the polar liquid absorbent polymer has a polar liquid absorption capacity of at least 10 times its own weight, preferably a polar liquid absorption capacity of at least 50 times its own weight and more preferably a polar liquid absorption capacity of at least 100 times its own weight. For example, the polar liquid absorbent polymer may be a superabsorbent polymer. Examples of such a superabsorbent polymer include copolymers selected from sodium polyacrylate, polyacrylamide copolymer, ethylene maleic anhydride copolymer, cross-linked carboxymethylcellulose, polyvinyl alcohol copolymer, cross-linked polyethylene oxide and starch grafted polyacrylonitrile copolymer. The polar liquid absorbent polymer preferably is a sodium polyacrylate copolymer.

In at least some embodiments, the elastomer is selected from polyurethane and polyether block amide as such elastomers are particularly suitable to provide a low-friction contact surface of the acoustic coupling layer with the patient's skin. The elastomer may form an elastomer matrix preferably having a hardness of less than 50 Shore A in order to ensure a stable embedding of the polar liquid absorbent polymer within the matrix and a low friction contact surface of the acoustic coupling layer. The polar liquid absorbent polymer may be chemically bound to the elastomer in order to provide a particularly stable embedding of the polar liquid absorbent polymer within the elastomer (matrix).

The polar liquid absorbent polymer may be loaded with a polar liquid and optionally may further comprise a gel-forming additive dissolved in the polar liquid loaded into the polar liquid absorbent polymer. This for example may be the case where the acoustic coupling layer is applied to a wearable patch or the like such that the wearable patch is ready for use.

According to another aspect, there is provided an ultrasound transducer comprising a major surface for contacting a body region and the acoustic coupling layer of any of the herein described embodiments covering said major surface. Such an ultrasound transducer is suitable for prolonged use on a patient's skin without requiring a contact liquid between the ultrasound transducer and the body region being periodically replenished as any polar liquid, e.g. water or hydrogel, lost from the interface between the ultrasound transducer and the body region is replenished from the reservoir of such a polar liquid provided by the polar liquid absorbent polymer within the acoustic coupling layer.

According to yet another aspect, there is provided a wearable patch comprising the ultrasound transducer of any of the herein described embodiments. Such a wearable patch can be worn by a patient for a prolonged period of time whilst ensuring a stable acoustic coupling between the ultrasound transducer and the patient's skin due to the replenishment of any lost or degraded polar liquid from the interface between the ultrasound transducer and the patient's skin from the reservoir of such a polar liquid provided by the polar liquid absorbent polymer within the acoustic coupling layer.

The patch acoustically couples an ultrasound transducer to a body region. The patch comprises a holder for the ultrasound probe and the acoustic coupling layer of the herein described embodiments for providing an interface layer between the ultrasound transducer and the body region when the ultrasound transducer is mounted in the holder. Such a patch may be disposable such that the ultrasound transducer may be prepared for patient interaction simply by attaching the patch to the ultrasound transducer, e.g. an ultrasound probe or the like, whilst after use the patch may simply be removed from the ultrasound transducer such that the ultrasound transducer may be prepared for such use in a straightforward manner whilst avoiding the risk that incorrect preparation of the ultrasound transducer, e.g. by incorrect application of a coupling fluid such as a coupling gel, impedes correct or optimal operation of the ultrasound transducer.

The patch may further comprise a removable water impermeable foil over the interface layer to prevent the interface layer from drying out whilst the patch is not in use. In addition, the patch may comprise a water impermeable seal around the interface layer to prevent such drying out and to ensure that the polar liquid is contained in between the interface layer and the patient's skin whilst the ultrasound transducer is in use.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
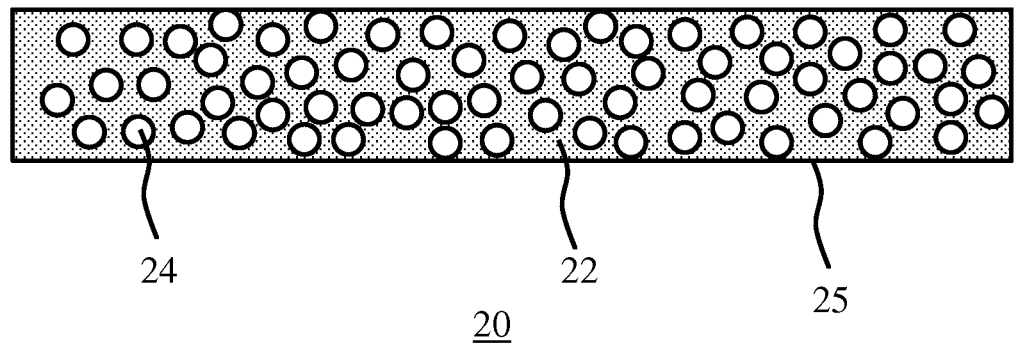
FIG. 1 schematically depicts an acoustic coupling layer according to an embodiment.

It should be understood that the Figures are merely schematic and are not drawn to scale. It should also be understood that the same reference numerals are used throughout the Figures to indicate the same or similar parts.

FIG. 1 schematically depicts a cross-sectional view of an acoustic coupling layer 20 according to example embodiments of the present invention. The acoustic coupling layer 20 comprises an elastomer 22 in which the polar liquid absorbent polymer 24 is embedded. The polar liquid absorbent polymer 24 acts as a reservoir for the polar liquid such that upon loading of the polar liquid into the polar liquid absorbent polymer 24 an external surface of the acoustic coupling layer 20, e.g. external surface 25, is wetted by the polar liquid in the polar liquid absorbent polymer 24. Consequently, when the polar liquid is transported away from the external surface 25, e.g. through evaporation, the polar liquid on the external surface 25 is replenished by the polar liquid stored in the polar liquid absorbent polymer 24 through desorption therefrom. The polar liquid is water in preferred embodiments although it should be understood that embodiments of the present invention are not limited thereto; it is for example equally feasible that a different polar liquid is loaded into the acoustic coupling layer 20, such as for example an alcohol or a mixture of polar liquids such as an alcohol/water mixture. Such an acoustic coupling layer 20 can provide an acoustic coupling between a skin region of the patient and an ultrasound transducer that is substantially free of air and can be retained for prolonged periods of time as will be explained in further detail below.

The polar liquid absorbent polymer 24 typically has a polar liquid absorption capacity of at least 10 times its own weight. Preferably, the polar liquid absorbent polymer 24 has a polar liquid absorption capacity of at least 50 times its own weight and more preferably the polar liquid absorbent polymer 24 has a polar liquid absorption capacity of at least 100 times its own weight. Preferably, the polar liquid absorbent polymer 24 is a superabsorbent polymer. A particularly suitable type of super absorbent polymer may be made from the polymerization of acrylic acid blended with sodium hydroxide in the presence of an initiator to form a poly-acrylic acid sodium salt, which is sometimes referred to as sodium polyacrylate. However, alternative embodiments of such superabsorbent polymers may be contemplated, such as for example polyacrylamide copolymer, ethylene maleic anhydride copolymer, cross-linked carboxymethylcellulose, polyvinyl alcohol copolymer, cross-linked polyethylene oxide and starch grafted polyacrylonitrile copolymer.

The elastomer 22 may form a thermoplastic elastomer matrix in which the polar liquid absorbent polymer 24 is embedded. Such an elastomer matrix preferably is water-permeable such that water (or another polar liquid) can transport from the polar liquid absorbent polymer 24 to the external surface 25 of the acoustic coupling layer 20 or vice versa. Suitable materials such a thermoplastic elastomer include polyurethane, polyether block amide (e.g. PEBAX as manufactured by the Arkema Corporation) or a co-polyester. Other suitable elastomers may be contemplated.

The elastomer 22 preferably is a polar elastomer to ensure a stable interface between the elastomer 22 and the polar liquid absorbent polymer 24. If the elastomer 22 is made of a non-polar elastomer, the long-term stability of the acoustic coupling layer 20 may be difficult to achieve due to the tendency of the polar liquid absorbent polymer 24 to separate from the non-polar elastomer 22. Although this may be overcome by using stabilizers in the acoustic coupling layer 20, it has been found that the dimensional stability of the acoustic coupling layer 20 cannot be guaranteed over a prolonged period of time, which may negatively impact upon the quality of the contact between the acoustic coupling layer 20 and the skin region of the patient onto which the acoustic coupling layer 20 is applied, e.g. when in situ on an ultrasound transducer. Such problems may be overcome by using a polar elastomer 22.

The elastomer preferably has a hardness of less than 50 Shore A in order to provide a relatively pliable elastomer 22 that can be moved across a skin region of the patient with relatively little friction. The elastomer 22 and the polar liquid absorbent polymer 24 preferably are biocompatible polymers such that they can be safely brought into contact with a patient.

The polar liquid absorbent polymer 24 is embedded within the elastomer 22 in the form of particles or granules. The diameter of such particles or granules is chosen such that the maximum diameter thereof is smaller than $1/10^{th}$ of the wavelength of any of the ultrasound waves produced by the ultrasound transducer onto which the acoustic coupling layer 20 is applied. In this manner, the particles or granules are substantially acoustically transparent, thereby minimizing scattering of the ultrasound waves when passing through the acoustic coupling layer 20. For example, for an ultrasound transducer producing ultrasound waves having a frequency f of around 10 MHz travelling at a velocity v of 1,500 m/s through a medium such as tissue, the wavelength $\lambda = v/f$ is 150 micron, such that the particle diameter should be kept below 15 micron to avoid reflections of ultrasound waves by such particles in a scenario in which there is an acoustic impedance mismatch between the elastomer matrix and the particle. Of course for different principal wavelengths of the ultrasound waves the particle diameter can be adjusted accordingly as will be readily understood by the skilled person. In particular, where the acoustic coupling layer 20 is deployed over such an ultrasound transducer it will be immediately apparent whether the particle sizes obey the aforementioned size restriction based on the frequency spectrum produced by the ultrasound transducer.

The polar liquid absorbent polymer 24 may be embedded within the elastomer (matrix) 22 in any suitable manner. For example, particles of the polar liquid absorbent polymer 24, e.g. a powder of the polar liquid absorbent polymer 24, may be dispersed or blended into the elastomer 22 at elevated temperatures, after which the particles of the polar liquid absorbent polymer 24 are fixated into the elastomer 22 through cooling. A carrier material of the polar liquid absorbent polymer 24 may be embedded in the elastomer 22 to which the polar liquid absorbent polymer 24 may be attached, e.g. through chemical bonding. Such a carrier material for instance may be a further polymer that improves the bonding between the elastomer 22 and the polar liquid absorbent polymer 24, e.g. in case the polar liquid absorbent polymer 24 alone bonds poorly to the elastomer 22. Alternatively, the polar liquid absorbent polymer 24 may be dissolved in the elastomer 22 to form a dispersion of the polar liquid absorbent polymer 24 in the elastomer 22 or the elastomer 22 and the polar liquid absorbent polymer 24 may be co-extruded to incorporate the polar liquid absorbent polymer 24 into the elastomer (matrix) 22. Such co-extrusion may be reactive co-extrusion in which the polar liquid absorbent polymer 24 is chemically bound, e.g. covalently or ionically bound, to the elastomer 22. Any other suitable method of embedding the polar liquid absorbent polymer 24 into the elastomer 22 may of course be contemplated.

Figure 2:
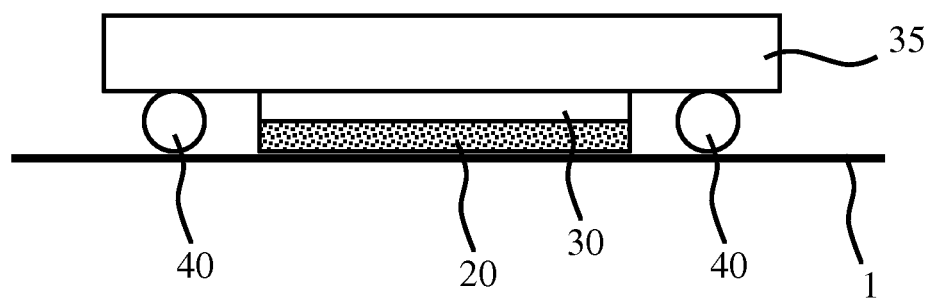
FIG. 2 schematically depicts a wearable patch according to an embodiment.

FIG. 2 schematically depicts a cross-sectional view of a wearable patch 10 to be deployed on a skin region 1 of a patient according to an example embodiment. The wearable patch 10 typically comprises a carrier or housing 35, which may be made of any suitable material, e.g. a plastic, metal, metal alloy, a composite material or combinations thereof. Onto the carrier or housing 35 is mounted an ultrasound transducer 30 comprising one or more ultrasound transducer elements (not shown) arranged along a major surface of the ultrasound transducer 30 for facing the skin region 1. The one or more ultrasound transducer elements may be any suitable type of ultrasound transducer elements such as piezoelectric transducer elements, e.g. PZT, or capacitive transducer elements such as CMUTs. Capacitive micro-machined ultrasound transducer (CMUT) elements are particularly suitable due to their superior bandwidth and ease of manufacture compared to piezoelectric transducer elements. The one or more ultrasound transducer elements are typically arranged such that the ultrasound waves generated by such elements exit the ultrasound transducer 30 through its skin-facing major surface such that such ultrasound waves can penetrate the skin region 1 of the patient.

The skin-facing major surface of the ultrasound transducer 30 is covered by an acoustic coupling layer 20 according to any of the herein described embodiments such that the interface between the ultrasound transducer 30 and the skin region 1 of the patient is continuously wetted by the polar solvent, e.g. water, stored in the polar solvent absorbent polymer 24 within the acoustic coupling layer 20. A water-impermeable seal 40, e.g. a rubber seal or the like, may extend from the housing carrier 35 to the skin region 1 of the patient when the wearable patch 10 is applied on the skin region 1. The water-impermeable seal 40 seals the space in between the carrier or housing 35 and the skin region 1 in which the ultrasound transducer 30 and the acoustic coupling layer 20 are located such that the polar liquid, e.g. water, cannot easily escape from this space, thereby further prolonging the operational lifetime of the wearable patch 10.

The acoustic coupling layer 20 of the wearable patch 10 may be pre-loaded with a polar solvent such as water. To this end, a removable water-impermeable tape or foil (not shown) may be deployed over the acoustic coupling layer 20 that may be removed prior to application of the wearable patch 10 onto the skin region 1 such that the acoustic coupling layer 20 does not dry out prior to use of the wearable patch 10. In order to reduce the rate of loss of polar solvent, e.g. water, from the acoustic coupling layer 20, the polar solvent may further comprise a gel-forming additive such as polyvinyl alcohol or nitrocellulose, or any other suitable gel-forming additive.

The wearable patch 10 may further comprise an adhesive such as a pressure-sensitive adhesive on a contact surface with the skin region 1 to adhere the wearable patch 10 to the skin region 1. For example, the adhesive may be applied on the water-impermeable seal 40. In this manner, the wearable patch 10 may be worn by the patient for a prolonged period of time without the risk of the wearable patch 10 falling off the patient's skin region 1. Of course, such an adhesive may be omitted if the wearable patch 10 comprises fastening means such as a strap or the like for fastening the wearable patch 10 onto the skin region 1 of the patient.

Figure 3:
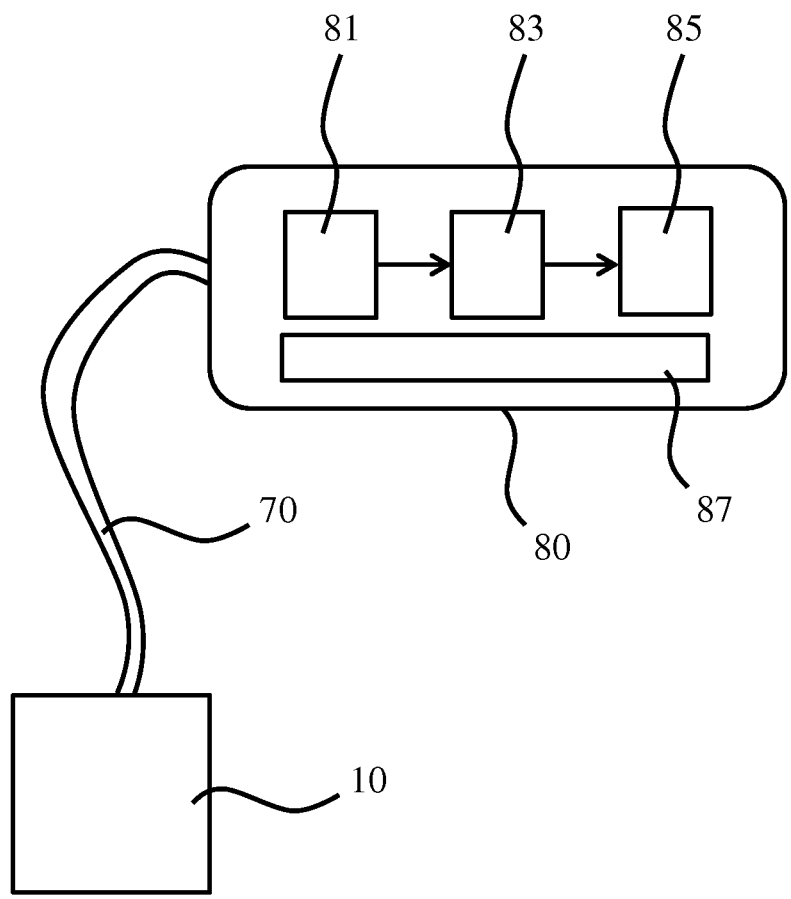
FIG. 3 schematically depicts a wearable patch assembly according to an embodiment.

FIG. 3 schematically depicts a wearable patch assembly 100 comprising the wearable patch 10 according to embodiments of the present invention and a control module 80 for controlling the ultrasound transducer 30. The control module 80 may be connected to the ultrasound transducer 30 through a wire or cable 70, which may be any suitable wire or cable, e.g. a coaxial cable, a cable comprising individually insulated wires, a ribbon comprising conductive tracks, and so on. The control module 80 may comprise circuitry 81 for controlling the ultrasound transducer 30. For example, the circuitry 81 may include an array controller coupled to a down conversion stage, which may form part of the array controller or may be a separate entity. The down conversion stage may apply noise filtering and frequency down conversion of the echo signals, e.g. from the MHz domain to the KHz domain, and employ a signal envelope to the down converted echo signals to reduce the amount of data that needs to be provided to a signal processor for deriving the desired bladder information from the acquired echo signals. Other suitable data reduction techniques will be immediately apparent to the skilled person.

The circuitry 81 may further comprise a signal processor for processing the signals received from the ultrasound transducer 30. Alternatively, such a signal processor may form part of a remote device, e.g. a wearable smart device such as a smart watch, a portable smart device such as a mobile phone or tablet computer, a laptop computer, a personal computer, or the like in order to reduce the computational effort required from the wearable patch 10 such that the lifetime of the battery 87 within the control module 80 may be extended.

The circuitry 81 may be communicatively coupled to a data storage device 83, e.g. a memory or the like, on-board the control module 80, with a wireless communication module 85 communicatively coupled to the data storage device 83 such that the data pertaining to the acquired echo signals as stored in the data storage device 83 may be periodically communicated to a remote device, e.g. in response to a communication request from the remote device. Any suitable wireless communication protocol, e.g. Bluetooth, Wi-Fi, a mobile communication protocol such as 3G, 4G, 5G or the like, a near field communication protocol (NFC), and so on, may be deployed for the communication between the control module 80 and the remote device.

As mentioned previously, the data pertaining to the acquired echo signals communicated from the control module 80 to such a remote device preferably is reduced in size to minimize the amount of data that needs to be communicated in this manner in order to extend the lifetime of the battery 87. It should be understood that in alternative embodiments in which the circuitry 81 comprises the signal processor, the wireless communication module 85 may be used to communicate a processing result of the signal processor to such a remote device, e.g. for visualization of the processing result on a display of the remote device.

In yet a further embodiment, the control module 80 is configured to upload the data pertaining to the acquired echo signals with a wireless communication module 85 into a remote data repository acting as an intermediary data storage device from which the remote device may download the stored data. This has the advantage that the remote device does not have to be within communication range of the wireless communication module 85 but instead may download the data at any suitable point in time to evaluate this data. For example, the remote data repository may be a cloud storage solution or the like, which may be accessed by both the wireless communication module 85 and the remote device over a network connection such as the Internet, in which case the wireless communication module 85 may establish a wireless connection with an Internet hub such as a router or the like within communication range of the wireless communication module 85 through which the data pertaining to the acquired echo signals may be uploaded into the remote data repository.

Figure 4:
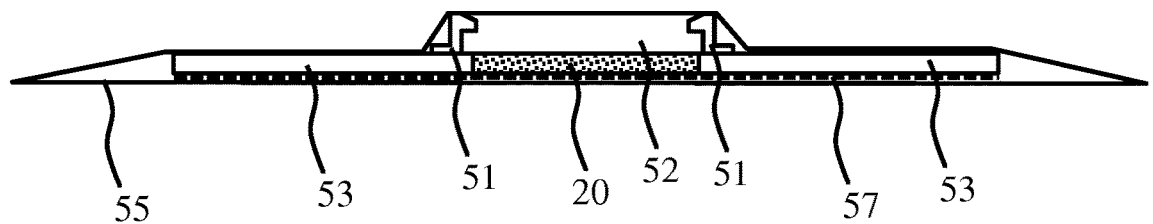
FIG. 4 schematically depicts a patch according to another embodiment.

FIG. 4 schematically depicts a cross-sectional view of a disposable interface module or patch 50 for an ultrasound transducer such as an ultrasound probe according to another example embodiment. The disposable patch 50 comprises a central cavity 52 within a removable package or seal 55 for housing at least part of the ultrasound transducer, with the acoustic coupling layer 20 arranged at a patient-facing end of the central cavity 52 such that when the ultrasound transducer is mounted into the disposable patch 50, the acoustic coupling layer 20 acts as an interface layer between the ultrasound transducer and the skin region of the patient to which the disposable patch 50 is applied. The central cavity 52 may comprise one or more mating members 51 designed to engage with a portion of the ultrasound transducer such that the ultrasound transducer is locked into place within the central cavity 52 when inserted therein. Such locking mechanisms are well-known per se and are therefore not explained in further detail for the sake of brevity only. It should suffice to state that any suitable locking mechanism may be used for this purpose.

The removable package or seal 55 may be made of any suitable material, e.g. a plastic or a metal such as aluminum. The disposable patch 50 may further comprise an adhesive layer 53, which for example may be arranged on a clamping ring (not shown) adjacent to the acoustic coupling layer 20, in order to adhere the disposable patch 50 to the skin region of the patient. A removable water-impermeable tape or foil 57 may be deployed over the acoustic coupling layer 20 and the adhesive layer 53 if present as is well-known per se. Alternatively, the adhesive layer 53 may be omitted if it is desirable that the disposable patch 50 can be moved across the skin of the patient, for example in applications where multiple ultrasound images of different parts of the body of the patient are to be collected with the ultrasound transducer. As mentioned before, the acoustic coupling layer 20 may be preloaded with the polar solvent and optional gel forming additives such that the acoustic coupling layer 20 is readily wetted when the disposable patch 50 is to be used. Although not specifically shown, the patch 50 may further comprise a water-impermeable seal (analogous to the seal 40) for retaining the polar solvent within the patch 50. The aforementioned clamping ring may act as such a seal. When preparing the disposable patch 50 for use, the removable package 55 is first removed, after which the removable tape or foil 57 is removed when present such that the disposable patch can be deployed onto a skin region of a patient.

Figure 5:
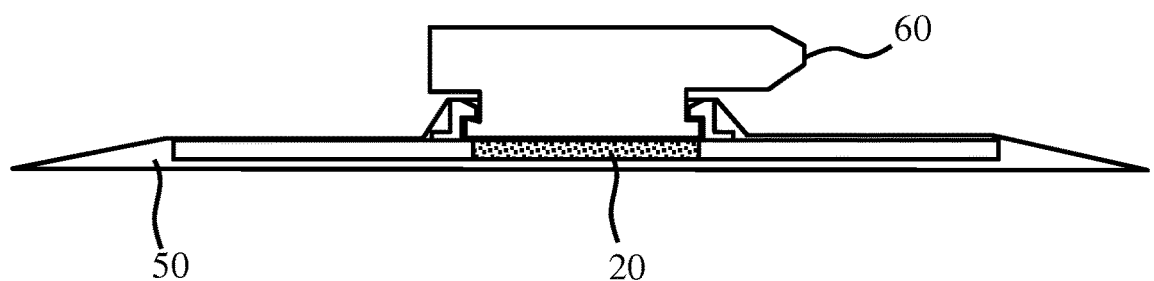
FIG. 5 schematically depicts the patch of FIG. 4 including an ultrasound transducer.

FIG. 5 schematically depicts a cross-sectional view of the disposable interface module or patch 50 into which an ultrasound probe 60 is mounted such that the ultrasound-transmitting surface of the ultrasound probe 60 contacts the acoustic coupling layer 20 such that the acoustic coupling layer 20 provides the acoustic coupling between the ultrasound probe 60 and the skin region of the patient. Consequently, a user of the ultrasound probe 60 does not have to prepare the acoustic coupling between the ultrasound probe 60 and such a skin region, e.g. by the application of an acoustic coupling gel or the like. Instead, such an acoustic coupling is readily provided by the acoustic coupling layer 20 within the disposable patch 50, which has the advantage that a consistent quality acoustic coupling between the ultrasound probe 60 and the skin region of the patient is provided, which is not guaranteed when such an acoustic coupling is to be manually applied by the user of the ultrasound probe 60. In addition, after use the ultrasound probe 60 requires minimal cleaning only whilst the disposable patch 50 may simply be disposed of, thereby improving user-friendliness and reducing the amount of time required to prepare the ultrasound probe prior to and after an ultrasound investigation.

Figure 6:
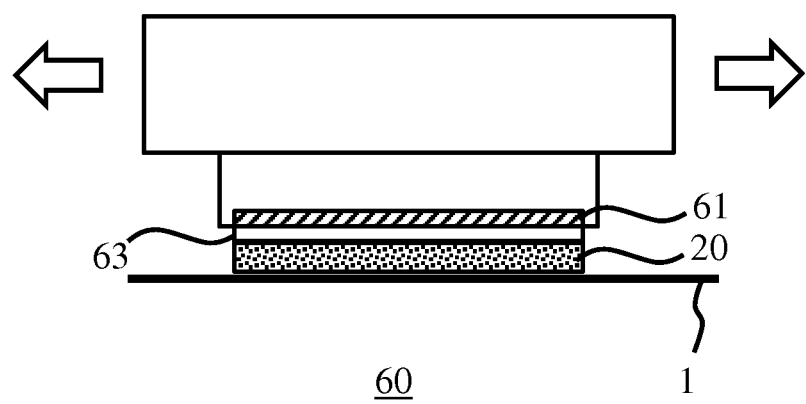
FIG. 6 schematically depicts an ultrasound transducer according to an embodiment.

FIG. 6 schematically depicts a cross-sectional view of an ultrasound transducer 60 according to yet another example embodiment. The ultrasound transducer 60 comprises an arrangement of ultrasound transducer elements 61, e.g. piezoelectric or capacitive transducer elements, on a surface for contacting a skin region 1 of a patient. Over this surface the acoustic coupling layer 20 is arranged in order to provide a long-lasting acoustic coupling between the ultrasound transducer elements 61 and the skin region 1. The acoustic coupling layer 20 may be affixed to the ultrasound transducer element-carrying surface of the ultrasound transducer 60 in any suitable manner, e.g. through adhesion. The ultrasound transducer 60 may further comprise an acoustic matching layer 63 to provide acoustic impedance matching between the ultrasound transducer elements 61 and the skin region 1 of the patient. The acoustic matching layer 63 for example may be arranged in between the ultrasound transducer elements 61 and the acoustic coupling layer 20. The acoustic matching layer 63 may be made of any suitable material. As such matching layers are well-known per se, this is not explained in further detail for the sake of brevity only.

During use, the ultrasound transducer 60 may be prepared by dipping at least the acoustic coupling layer 20 into a polar solvent such as water, thereby loading the polar solvent absorbent polymer 24 within the acoustic coupling layer 20 with the polar solvent such that the contact surface between the acoustic coupling layer 20 and the skin region 1 of the patient can be continuously replenished with the polar solvent desorbing from the polar solvent absorbent polymer 24 within the acoustic coupling layer 20. In this manner, the ultrasound transducer 60 may be used over a prolonged period of time without the risk of degradation of the acoustic coupling between the ultrasound transducer 60 and the skin region 1, as the formation of air bubbles at this interface is generally avoided and the degradation of the coupling medium is prevented by the replenishment of the coupling medium, i.e. the polar solvent, from the polar solvent absorbent polymer 24.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A patch for acoustically coupling an ultrasound transducer to a body region, the patch comprising:
   a holder for the ultrasound transducer; and
   an acoustic coupling layer for acoustically coupling the ultrasound transducer to the body region, the acoustic coupling layer providing an interface layer between the ultrasound transducer and the body region when the ultrasound transducer is mounted in the holder,
   wherein the acoustic coupling layer comprises a polar liquid absorbent polymer embedded in an elastomer in a form of a plurality of particles dispersed or dissolved within the elastomer, wherein each particle of the plurality of particles has a diameter of less than 10% of any acoustic wavelength produced by the ultrasound transducer.

2. The patch according to claim 1, wherein the polar liquid absorbent polymer has a polar solvent absorption capacity of at least 10 times its own weight.

3. The patch according to claim 1, wherein the polar liquid absorbent polymer is a copolymer selected from sodium polyacrylate, polyacrylamide copolymer, ethylene maleic anhydride copolymer, cross-linked carboxymethylcellulose, polyvinyl alcohol copolymer, cross-linked polyethylene oxide and starch grafted polyacrylonitrile copolymer.

4. The patch according to claim 1, wherein the elastomer comprises at least one of polyurethane or polyether block amide.

5. The patch according to claim 1, wherein the elastomer forms an elastomer matrix.

6. The patch according to claim 5, wherein the elastomer matrix has a hardness of less than 50 Shore A.

7. The patch according to claim 1, wherein the polar liquid absorbent polymer is chemically bound to the elastomer.

8. The patch according to claim 1, wherein the polar liquid absorbent polymer is loaded with a polar liquid and further comprises a gel-forming additive dissolved in the polar liquid loaded into the polar liquid absorbent polymer.

9. The patch according to claim 1, further comprising a removable water impermeable foil over the interface layer.

10. The patch according to claim 1, further comprising a water impermeable seal around the interface layer.

11. The patch according to claim 1, wherein elastomer comprises a polar elastomer for ensuring a stable interface between the elastomer and the polar liquid absorbent polymer.

12. The patch according to claim 1, wherein the polar liquid absorbent polymer has a polar solvent absorption capacity of at least 100 times its own weight.

13. The patch according to claim 1, wherein the acoustic coupling layer further comprises a carrier material embedded in the elastomer to which the plurality of particles of the polar liquid absorbent polymer attaches through chemical bonding.

14. The patch according to claim 1, wherein the polar liquid absorbent polymer is preloaded with a polar liquid, such that an external surface of the acoustic coupling layer is wetted by the polar liquid in the polar liquid absorbent polymer.

15. The patch according to claim 14, wherein the external surface of the acoustic coupling layer is configured to be replenished by the polar liquid in the polar liquid absorbent polymer through desorption when the polar liquid is transported away from the external surface.

16. The patch according to claim 1, wherein the holder comprises a central cavity configured to removably receive the ultrasound transducer, and one or more mating members configured to engage with a portion of the ultrasound transducer to lock the ultrasound transducer into place within the central cavity.

17. An ultrasound transducer comprising:
a major surface for contacting a body region; and
an acoustic coupling layer covering the major surface, wherein the acoustic coupling layer comprises a polar liquid absorbent polymer embedded in an elastomer in a form of a plurality of particles dispersed or dissolved within the elastomer, wherein each particle of the plurality of particles has a diameter of less than 10% of any acoustic wavelength produced by the ultrasound transducer.

18. The ultrasound transducer according to claim 17, wherein the acoustic coupling layer is detachably affixed to the major surface.

19. A patch for acoustically coupling an ultrasound transducer to a body region, the patch comprising:
a holder configured to receive the ultrasound transducer; and
an acoustic coupling layer configured to acoustically couple the ultrasound transducer to the body region, the acoustic coupling layer providing an interface layer between the ultrasound transducer and the body region, wherein the acoustic coupling layer comprises an elastomer and a polar liquid absorbent polymer configured to store a polar liquid for wetting and rewetting an external surface of the acoustic coupling layer, wherein the polar liquid absorbent polymer comprises a plurality of particles dispersed or dissolved within the elastomer, wherein each particle of the plurality of particles is small enough to avoid reflections of ultrasound waves produced by the ultrasound transducer.

* * * * *